(12) United States Patent
Kolor et al.

(10) Patent No.: US 6,470,417 B1
(45) Date of Patent: Oct. 22, 2002

(54) EMULATION OF NEXT GENERATION DRAM TECHNOLOGY

(75) Inventors: Daniel J. Kolor, Wappingers Falls; Scott J. Hadderman, Pleasant Valley, both of NY (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 09/592,525

(22) Filed: Jun. 12, 2000

(51) Int. Cl.[7] ............................................. G06F 12/02
(52) U.S. Cl. ....................................................... 711/105
(58) Field of Search ................................. 711/105, 170, 711/5

(56) References Cited

U.S. PATENT DOCUMENTS

| | | | |
|---|---|---|---|
| 5,371,866 A | 12/1994 | Cady | 395/400 |
| 5,590,071 A | 12/1996 | Kolor et al. | 365/149 |
| 5,702,984 A | * 12/1997 | Bertin et al. | 437/208 |
| 5,745,914 A | * 4/1998 | Connolly et al. | 711/105 |
| 6,324,114 B1 | * 11/2001 | Himeno | 365/230.03 |

* cited by examiner

*Primary Examiner*—Kevin L. Ellis
(74) *Attorney, Agent, or Firm*—Cantor Colburn LLP; William Kinnaman

(57) ABSTRACT

A current generation, quad RAS, single CAS, stacked component (101) including four 4 Mb×4 bits 11/11 DRAMs (210–213) is arranged to emulate a next generation 16 Mb×4 bits 12/12 DRAM. The (24) bit address signal provided by memory controller (105) includes a row address of 12 bits and a column address of 12 bits. Each DRAM (210–213) within the current generation DRAM component (101) requires only 11 row address bits and 11 column address bits. The additional 1 row address bit and 1 column address bit are provided to decoder logic (103). The additional row address bit is decoded by the decoding logic (103) to direct the RAS signals over two of the four RAS lines (201–204), thereby activating the two signaled DRAMs. The additional column address bit is then decoded by decoding logic (103) to de-activate one of the two signaled DRAMs, leaving only one DRAM activated. CAS line (205) directs the CAS signal to all of the stacked DRAMs (210–213). The combination of both RAS and CAS is provided to only one of the plurality of current generation DRAMs, thereby permitting access to that particular current generation DRAM.

20 Claims, 5 Drawing Sheets

EMULATION OF NEXT GENERATION DRAM TECHNOLOGY

TECHNICAL FIELD

This invention is related to digital processing systems using Dynamic Random Access Memory (DRAM), and particularly to the emulation of next generation dram technology.

BACKGROUND OF THE INVENTION

For standard page mode Dynamic Random Access Memory (DRAM), the addressing of the memory array is broken up into row and column addresses by a memory controller. The row and column addresses are multiplexed over the same bus, and are captured by the DRAM with Row Address Strobe (RAS) and Column Address Strobe (CAS) lines. In DRAM employing square addressing, the number of row address bits is equal to the number of column address bits. For example, a "16 Mb×4 bit 12/12 DRAM" represents a DRAM having a storage capacity of 64 Megabits (Mb) employing square addressing with 12 row address bits and 12 column address bits (12/12).

Each new generation of DRAM technology provides a greater storage capacity than the previous generation. A successive generation of DRAM typically has four times the storage capacity of the previous generation. For example, a current generation DRAM may have a storage capacity of 4 Mb×4 bits, while a next generation DRAM may have a storage capacity of 16 Mb×4 bits. In order to achieve the best price performance for a particular memory design, it is important that the design use the DRAM generation that offers the lowest cost per bit of storage.

Additionally, it would be desirable for the design to easily accommodate the next generation DRAM component, so as to provide a simple and inexpensive transition into that technology when it eventually becomes the lowest cost per bit of storage design solution. However, as a result of space limitations on the circuit board, it is typically not feasible to utilize discrete current generation DRAM components as "temporary" replacements for a next generation DRAM component since approximately four times as much board space is required for the discrete devices, and extensive card redesign would be needed to migrate to the next generation device. In addition, there are differences in the addressing schemes used by the current and next generation DRAMs. A current generation 4 Mb×4 DRAM, for example, may have square addressing with 11 row address bits and 11 column address bits (11/11), while a next generation 16 Mb×4 DRAM may have square addressing with 12 row address bits and 12 column bits (12/12). It is clear that two additional address bits are needed to address the next generation DRAM. As a result, extensive redesign of the DRAM controller would be necessary to accommodate the addressing scheme of the next generation DRAM.

The use of stacked DRAM components to conserve circuit board space is well known. For example, U.S. Pat. No. 5,371,866 issued on Dec. 6, 1994 to Cady, et al. teaches the use of a stacked DRAM device utilizing a quad RAS decoding scheme wherein address bits from the address bus are used to access the stacked component. However, Cady et al. requires that the addressing scheme for the current generation DRAMs be utilized, thus failing to emulate a next generation component.

U.S. Pat. No. 5,590,071 issued on Dec. 31, 1996 to Kolor et al. ('071 patent) facilitates the emulation of a next generation DRAM by utilizing a component that includes a plurality of DRAMs having a cumulative memory capacity that is at least equal to the capacity of the DRAM component that is to be emulated. The '071 patent permits the use of a common controller to access the next generation DRAM component as well as the current generation multiple DRAM component so as to facilitate migration to the next generation component when such a migration becomes economically expedient. The invention utilizes the additional bits from the controller's address signal that are required to address the next generation DRAM, but are not utilized in addressing any one of the lower density DRAMs in the current generation multiple DRAM component. These additional bits are decoded to direct DRAM control signals such as RAS and CAS or WRITE and Output Enable so as to permit one of the plurality of DRAMs to be accessed. The '071 patent discloses the steering of DRAM control signals such as RAS and CAS on to output lines from a decoder such that only one of the plurality of DRAMs in the current generation component receives both a RAS and a CAS signal. For example, the '071 patent teaches the emulation of a 16 Mb×4 bit 12/12 DRAM using a quad RAS, dual CAS stacked component including 4 Mb×4 bit 11/11 DRAMs. The stacked component has four independent RAS lines and two independent CAS lines, which are accessible as pins at the package level. The additional row address bit is decoded and used to direct the RAS signals over two of the four RAS lines, and the additional column address bit is decoded and used to direct the CAS signal over one of the two CAS lines. The RAS and CAS lines are arranged such that only one current generation DRAM in the stacked component receives both a RAS and a CAS signal, thereby selecting that DRAM.

The '071 patent permits migration to a next generation DRAM without altering wiring on the printed circuit board or changing the memory controller used to access the DRAM component. However, the method and apparatus disclosed therein for a DRAM having square addressing is not applicable to stacked components having four independent RAS lines and only one CAS line, such as the 32 pin TSOJ stacked DRAM package manufactured by International Business Machines Corporation (IBM) under model number 42G9062.

SUMMARY OF THE INVENTION

The above stated problems and related problems of the prior art are solved with the principles of the present invention, the emulation of a high capacity DRAM component via a single component which includes a plurality of lower memory capacity DRAMs having a cumulative memory capacity greater than or equal to the memory capacity of the DRAM component that is being emulated.

The invention takes advantage of the fact that an address bus for the higher capacity DRAM will contain extra row and column address bits as compared an address bus for each of the plurality of lower capacity DRAMS. The extra row address bit from the memory controller is decoded by decoding logic to direct the DRAM control signal to activate a group of DRAMs from the plurality of lower capacity DRAMs. The extra column address bit is then decoded by the decoding logic to de-activate all but one of the group of DRAMs previously activated. Thus, only one of the lower capacity DRAMs remains active to receive the address signal for the lower capacity DRAM.

The invention allows the emulation of the high memory capacity DRAM component using a quad RAS, single CAS component that utilizes the industry standard footprint for the high memory capacity DRAM component to permit migration thereto without requiring a redesign of the circuit board. Furthermore, the invention provides the ability to use the same addressing scheme for the component containing the plurality of lower memory capacity DRAMs as would be used for the high memory capacity component, thus permitting migration to the high memory capacity component using the same DRAM controller used to access the current generation component including the plural lower memory capacity DRAMs.

BRIEF DESCRIPTION OF THE DRAWINGS

Referring now to the drawings wherein like elements are numbered alike in the several FIGS..

DETAILED DESCRIPTION OF THE INVENTION

Figure 1:
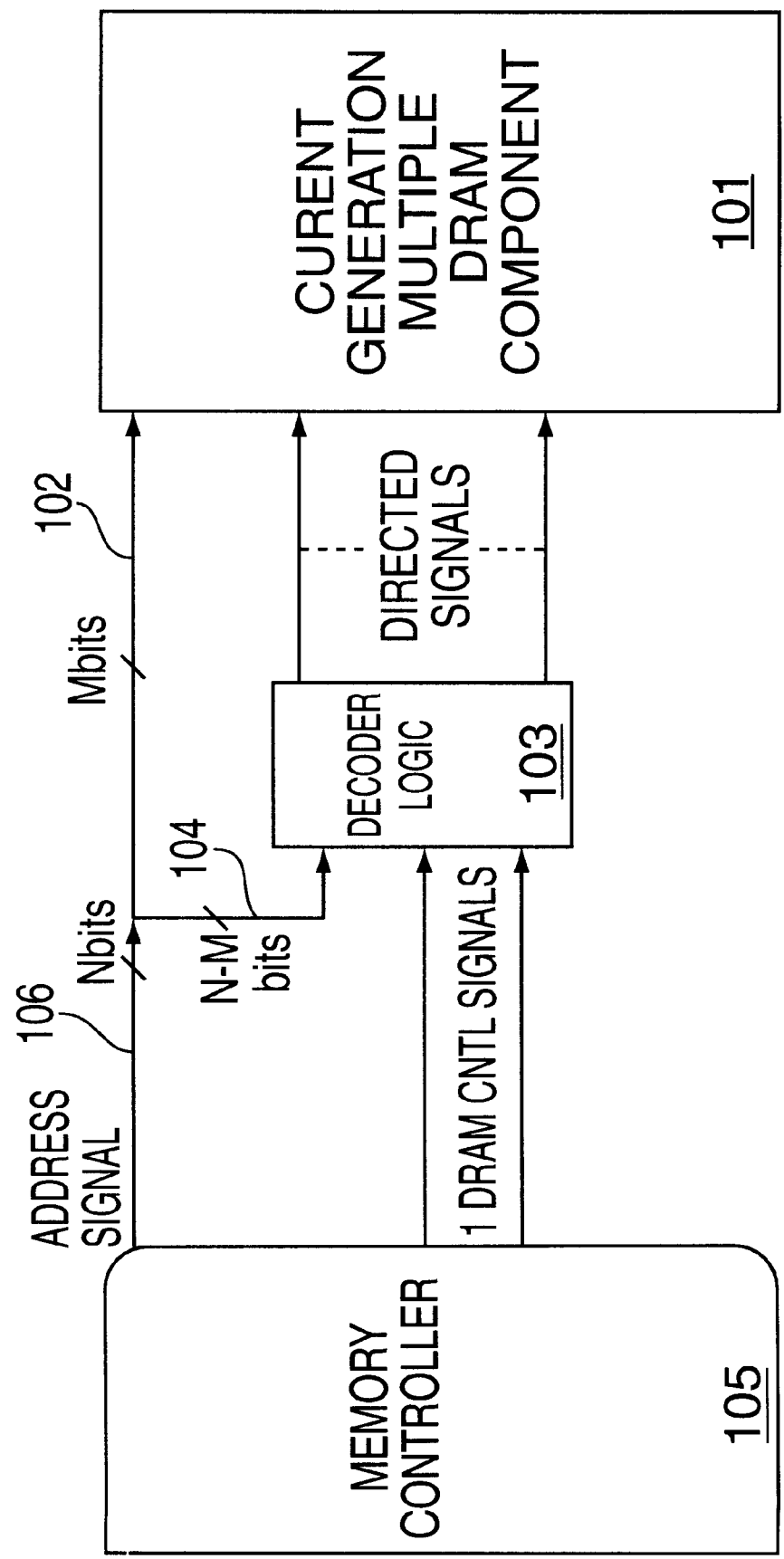
FIG. 1 shows a schematic diagram of an apparatus for emulating a next generation DRAM component.

Referring to FIG. 1, a current generation multiple DRAM component 101 is arranged to emulate a next generation DRAM (not shown). Emulation is used here to imply that the current generation multiple DRAM component 101 is configured so as to make it appear to a memory controller 105 to be a next generation DRAM instead of a plurality of current generation DRAMs. As illustrated in FIG. 1, an address signal for the next generation DRAM is provided by memory controller 105 on a line 106. The address signal for the next generation DRAM is N bits in length. For a square addressing scheme, this address signal comprises a group of N/2 row address bits and a group of N/2 column address bits, which are provided to line 106 in multiplexed fashion. Current generation DRAM component 101 includes a plurality of current generation DRAMs there within. Each of these current generation DRAMs requires an address signal of M bits in length, where M is less than N. The difference between the length of the next generation address signal (N) and the length of the current generation address signal (M) results in N-M surplus bits.

Decoder logic circuitry 103 is configured to receive the surplus bits, N-M, on a line 104. For a square addressing scheme, the surplus bits are divided between the row and column addresses. In other words, there are (N-M)/2 surplus bits in the row address and (N-M)/2 surplus bits in the column address. These surplus bits are decoded by decoding logic 103. Decoding logic 103 first decodes the surplus address bits from the row address and directs a first control signal, such as RAS, from the memory controller 105 to a first group of $2^{(n-m)}$ DRAMs in the current generation multiple DRAM component 101. Decoding logic 103 then decodes the surplus address bits from the column address and de-activates the control signal from $2^{(n-m)}-1$ DRAMs within the first group of $2^{(nm)}$ DRAMs. Thus, only one of the DRAMs within multiple DRAM component 101 continues to receive the first control signal. Decoding logic 103 also directs a second control signal, such as a CAS signal, to all DRAMs within multiple dram component 101. In such an embodiment, the combination of both the first and second control signals is provided to only one of the plurality of current generation DRAMs, thereby permitting access to that particular current generation DRAM. It can be seen that this method will work for any multiple dram component 101 comprising $2^{(nm)2}$ DRAMs. This method allows emulation of a next generation DRAM with square addressing using stacked components having four independent RAS lines and only one CAS line.

Figure 2:
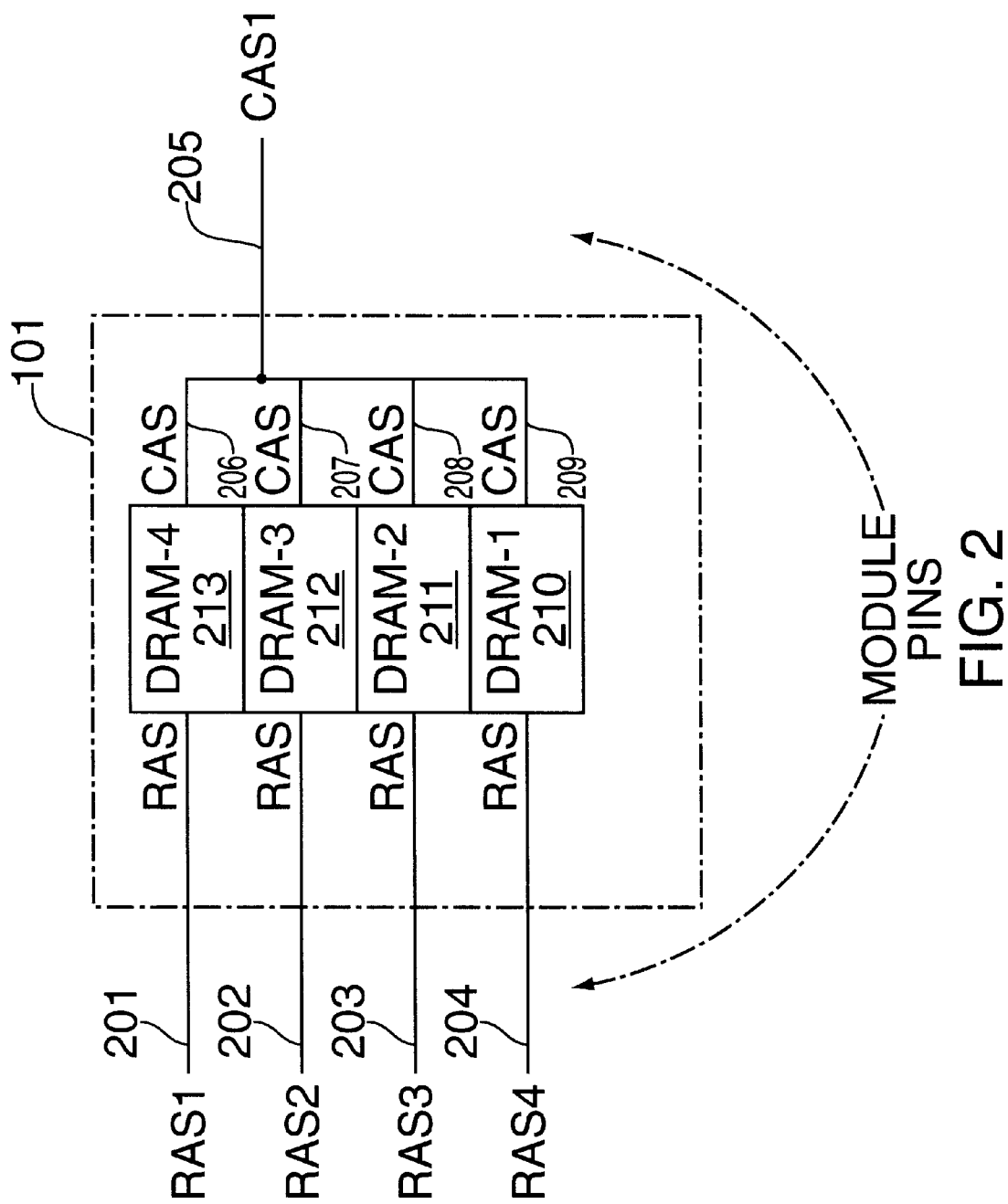
FIG. 2 illustrates the RAS and CAS connections for a quad RAS, single CAS stacked component of 4 Mb×4 bit 11/11 DRAMs.

FIG. 2 illustrates the package-level control signal connections for a stacked DRAM component 101 which is used to emulate, for example, a 16 Mb×4 bits 12/12 DRAM component having a storage capacity of 64 Mb. The emulation is performed using a quad RAS, single CAS, stacked component 101 including four 4 Mb×4 bits 11/11 DRAMs 210-213. The stack 101 has four independent RAS lines 201-204 and one independent CAS line 205 which would be accessible as pins of DRAM component 101 at the package-level. RAS lines 201-204 are connected to DRAMs 210-213. CAS line 205 is connected to the individual CAS lines 206-209 of each DRAM component.

Figure 3:
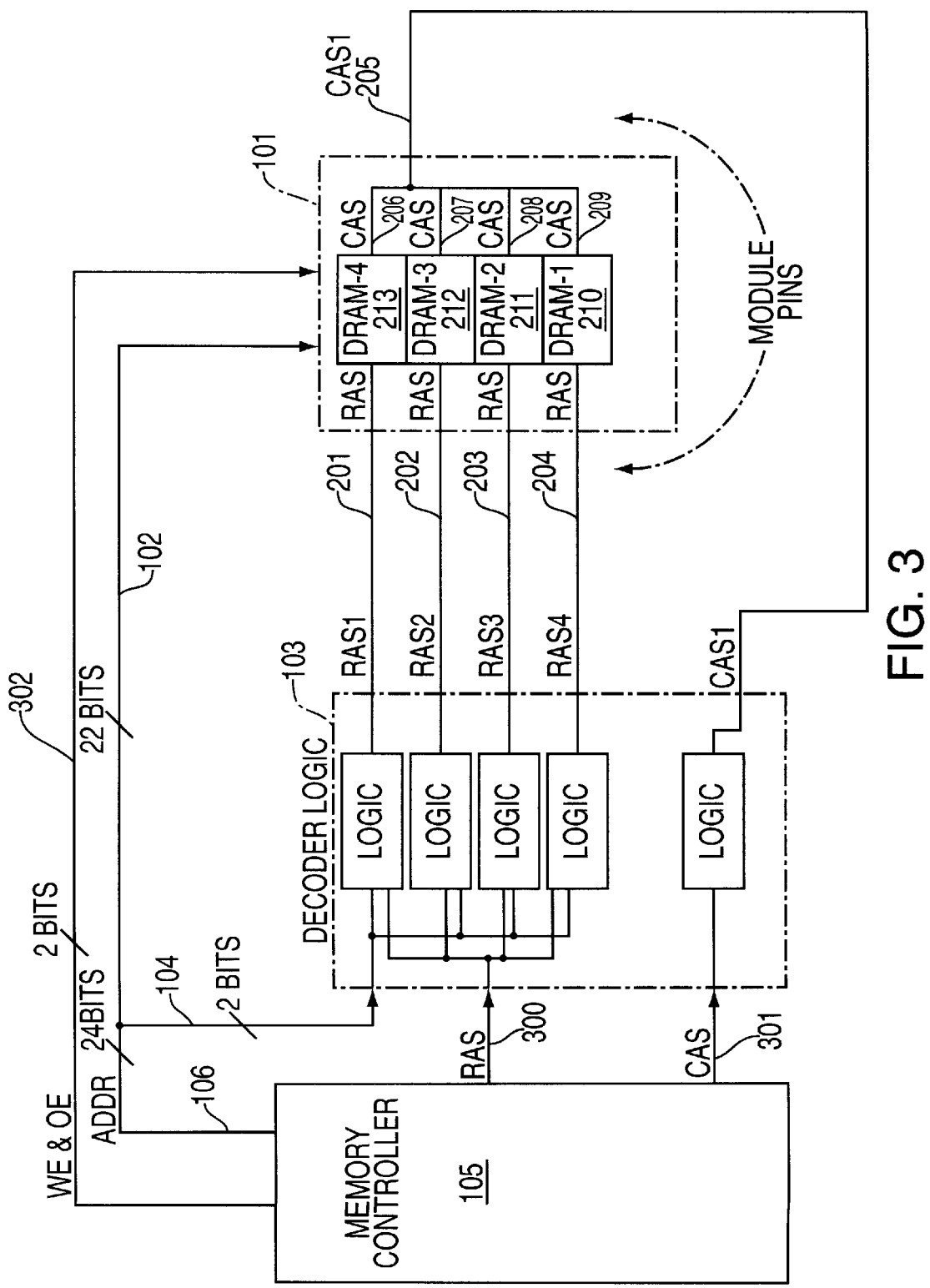
FIG. 3 shows the quad RAS, single CAS stacked component of FIG. 2 arranged to emulate a next generation 16 Mb×4 bits 12/12 DRAM.

FIG. 3 shows current generation multiple DRAM component 101 arranged to emulate a next generation 16 Mb×4 bits 12/12 DRAM (not shown). Memory controller 105 provides RAS and CAS signals to decoder logic 103 via lines 300 and 301, and Write Enable (WE) and Output Enable (OE) signals to current generation DRAM component 101 via line 302. Memory controller 105 also sends a 24 bit address signal to line 106. Two bits of the address signal are received by decoder logic 103 via line 104, and the remaining 22 bits are received by the current generation DRAM component 101 via line 102. Decoder 103 directs RAS signals to current generation DRAM component 101 via RAS lines 201, 202, 203, and 204, which connect to RAS pins on DRAMs 213, 212, 211, and 210, respectively. Decoder 103 also directs CAS signals to DRAM component 101 via CAS line 205. CAS line 205 is connected to CAS pins on DRAMS 213, 212, 211, and 210 for providing a CAS signal to each of these DRAMS.

The 24 bit address signal provided by memory controller 105 includes a row address of 12 bits and a column address of 12 bits, with row and column addresses being multiplexed on line 106. Each DRAM 210-213 within the current generation DRAM component 101 requires only 11 row address bits and 11 column address bits, which are provided in multiplexed fashion to DRAM component 101 via line 102. The additional 1 row address bit and 1 column address bit are provided in multiplexed fashion to decoder logic 103 via line 104. The additional row address bit is decoded by the decoding logic 103 to direct the RAS signals over two of the four RAS lines 201-204 that connect to the stacked DRAMs 210-213, thereby activating the two signaled DRAMs. The additional column address bit is then decoded by decoding logic 103 to de-activate one of the two signaled DRAMs, leaving only one DRAM activated. CAS line 205 directs the CAS signal to all of the stacked DRAMs 210-213 via lines 206-209. The combination of both RAS and CAS is provided to only one of the plurality of current generation DRAMs, thereby permitting access to that particular current generation DRAM. The accessed current generation DRAM receives the 22 bit address signal (11 row address bits and 11 column address bits) from line 102 and identifies the memory location indicated by the 22 bit address signal.

Figure 4:
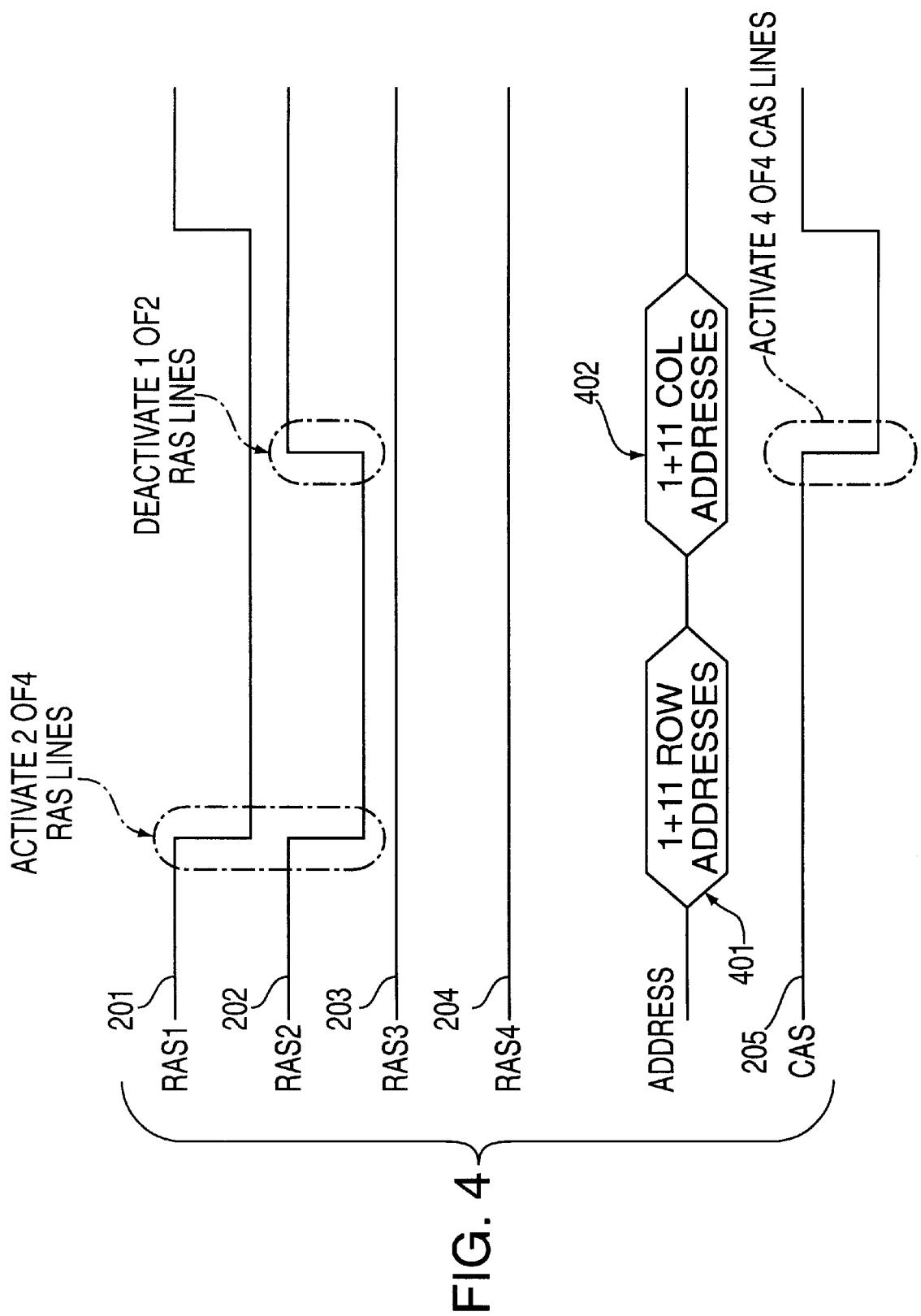
FIG. 4 illustrates a simplified timing diagram for a control logic circuit of FIG. 3.

Referring to FIGS. 3 and 4, FIG. 4 illustrates a simplified timing diagram for the emulation scheme. The additional row address bit 401 is first received by decoder logic 103, permitting the selective activation of two of the four RAS lines, shown in this example as RAS lines 201 and 202. The additional column address bit 402 is next received, permitting the de-activation of one of the two activated RAS lines, shown here as RAS line 202, and the simultaneous activation of all CAS lines 206–209 via CAS line 205. The coincidence of a directed RAS and CAS pair will activate only one of the four DRAMs, DRAM 213 in this example, within the current generation DRAM component 101.

Figure 5:
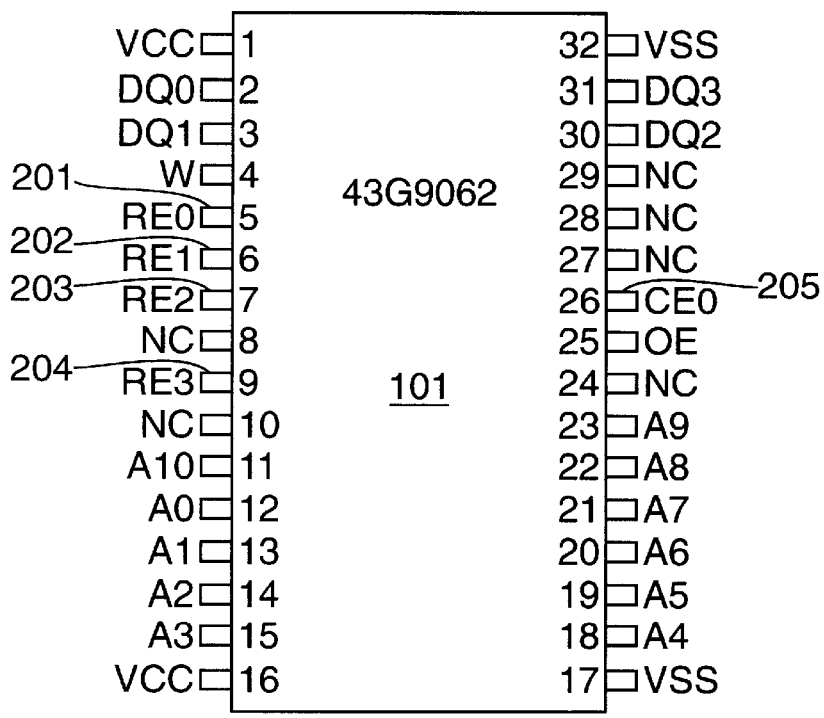
FIG. 5 shows the pin arrangement for an embodiment of the quad RAS, single CAS component of FIG. 2.

FIG. 5 shows an embodiment of the quad RAS, single CAS current generation DRAM component 101. This embodiment of current generation component 101 includes 4 stacked 4 Mb×4 bit 11/11 DRAMs, and is currently available from IBM Corporation as IBM part number 43G9062. Current generation component 101 receives RAS lines 201–204 at pins 5, 6, 7, and 9, respectively, and CAS line 205 at pin 26.

Figure 6:
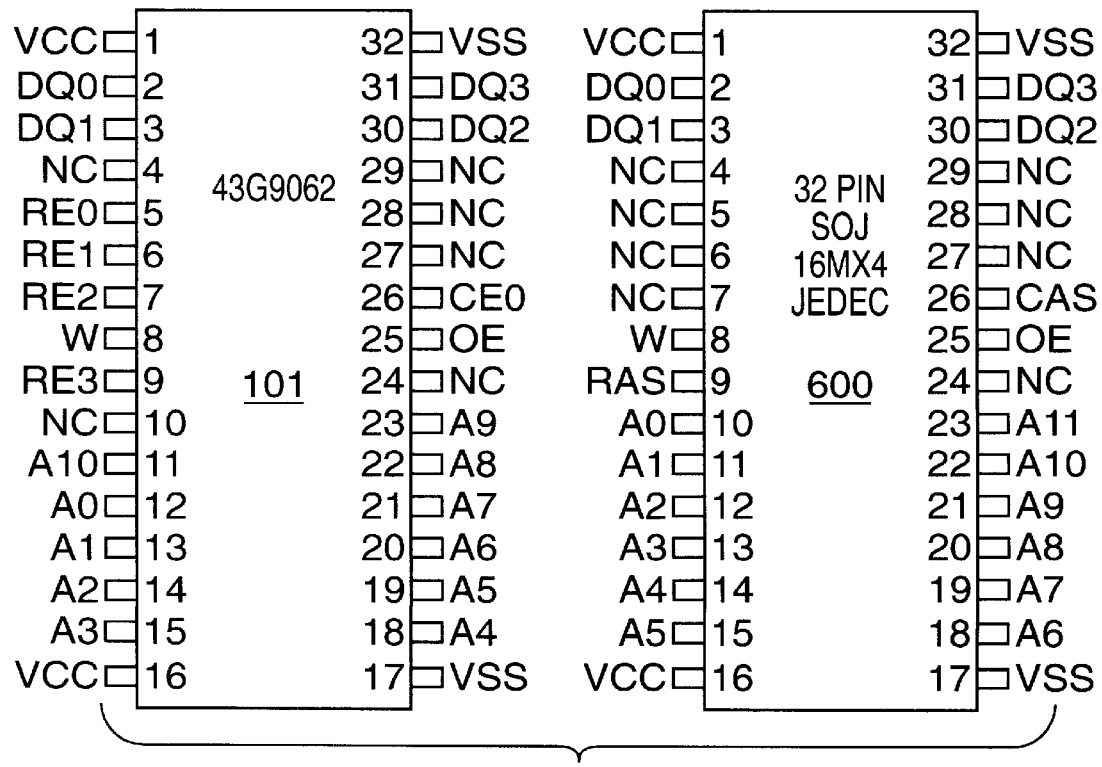
FIG. 6 illustrates the compatibility between the pin arrangement of an embodiment of the quad RAS, single CAS component and the proposed JEDEC package for the 16 Mb×4 bit 12/12 next generation component.

FIG. 6 illustrates the compatibility between the embodiment of current generation DRAM component 101 shown in FIG. 5 and the 64 Mb 16 Mb×4 bit 12/12 next generation DRAM 601 as described in the JEDEC 16 Mb×4 bit DRAM standard, which is incorporated herein by reference. As shown in FIG. 6, the current generation DRAM component 101 uses pins 5–7 as RAS enable pins RE0, RE1 and RE2, pin 9 as RAS enable pin RE3, and pin 26 as CAS enable pin CE0. This pin out arrangement is compatible with the JEDEC component 600, in which pins 5–7 are no connects, pin 9 is a RAS input, and pin 26 is a CAS input. The remaining pins on these two components have identical pin assignments. The JEDEC specification provides that the next generation component 600 will be available in an SOJ-32 (400 mil×825 mil) package identical to the 4000 mil×825 mil dimensions of the current generation embodiment 101. Thus, the device has the same footprint as the next generation device. Because the footprint for the current and next generation devices are the same, a common board can be designed for both the current generation stacked component and the next generation stacked component.

The method and apparatus described herein permits migration to a next generation DRAM without altering wiring on the printed circuit board or changing the memory controller used to access the DRAM component. Moreover, the method and apparatus described herein can be applied to stacked components having four independent RAS lines and only one CAS line.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for emulating a first DRAM component having a first storage capacity, said first DRAM component being accessed by receiving an address signal from a controller together with DRAM control signals, said address signal including a first number of address bits, said first number of address bits including a first plurality of row address bits and a first plurality of column address bits, said apparatus comprising:

an integrated circuit component including a plurality of second DRAMs, each of said plurality of second DRAMs having a second storage capacity, said second storage capacity being lower than the first storage capacity, wherein the cumulative total of said second storage capacities for said plurality of second DRAMs is at least equal to said first storage capacity, and wherein each of said plurality of second DRAMs may be accessed by receiving a second number of address bits from said address signal provided by said controller together with said DRAM control signals, said second number of address bits being less than said first number of address bits; and a decoder having at least one first input for receiving a number of decode bits from said address signal provided by said controller, said number of decode bits including at least one of said first plurality of row address bits and at least one of said first plurality of column address bits, said number of decode bits being equal to the difference between the first number of address bits and the second number of address bits, said decoder further having at least one second input for receiving at least one of said DRAM control signals, said decoder decoding said at least one of said first plurality of row address bits to direct the output of said at least one DRAM control signal to activate a group of second DRAMs within said plurality of second DRAMs, and said decoder decoding said at least one of said first plurality of column address bits to deactivate all but one second DRAM within said group of second DRAMs and permit access to said one second DRAM.

2. The apparatus of claim 1 wherein said first plurality of row address bits and said first plurality of column address bits are multiplexed over an address bus to said first DRAM component.

3. The apparatus of claim 1 wherein said at least one DRAM control signal includes a row address strobe, and wherein said at least one directed DRAM control signal includes a directed row address strobe.

4. The apparatus of claim 1 wherein said at least one DRAM control signal includes a row address strobe and a column address strobe, and wherein said at least one directed DRAM control signal includes a directed row address strobe, and wherein said decoder is coupled to said at least one input for receiving said at least one directed DRAM control signal to provide the combination of the directed row address strobe and the column address strobe to said one second DRAM.

5. The apparatus of claim 1 wherein said first DRAM component is a 16 Megabits by 4 bits DRAM and wherein said first plurality of row address bits includes 12 bits and said first plurality of column address bits includes 12 bits.

6. The apparatus of claim 5 wherein said integrated circuit component includes four of said second DRAMs and wherein each of said second DRAMs is a 4 Megabits by 4 bits DRAM having a second plurality of row address bits and a second plurality of column address bits, said second plurality of row address bits includes 11 bits and said second plurality of column address bits includes 11 bits.

7. The apparatus of claim 4 wherein said integrated circuit component further includes a package housing said plurality of second DRAMs, and wherein said package further include a first plurality of pins extending therefrom, at least one of said pins receiving said directed row address strobe and at least one of said pins receiving said column address strobe, and a second plurality within said first plurality of pins receiving said second row address and said second column address.

8. The apparatus of claim 7 wherein four of said first plurality of pins may receive said directed row address strobe, and wherein each of said four pins connects to a different one of said plurality of second DRAMs for providing the directed row address strobe signal thereto, and wherein one of said first plurality of pins receives said column address strobe, and wherein said one of said first plurality of pins connects to each of said plurality of second DRAMs for providing the column address strobe thereto.

9. The apparatus of claim 1 wherein said integrated circuit component further includes a package housing said plurality of second DRAMs, and wherein said package has a physical footprint that is identical to a physical footprint for said first DRAM component, and wherein said package further includes a plurality of pins extending therefrom, and wherein the connections of said plurality of pins to said package are identical to pin connections for a plurality of pins connected to said first DRAM component, and wherein said plurality of pins connected to said package housing said plurality of second DRAMs have pin assignments that are compatible with said plurality of pins connected to said first DRAM component to permit said integrated circuit component including said plurality of second DRAMs and said first DRAM component to be used interchangeably on a circuit board without requiring any wiring changes on the circuit board.

10. The apparatus of claim 9 wherein said package for said first DRAM component and said package for said integrated circuit component both have thirty two pins extending therefrom.

11. The apparatus of claim 10 wherein said first DRAM component uses pin ten through pin fifteen and pin eighteen through pin twenty three for receiving said first address signal and wherein said integrated circuit component uses pin eleven through pin fifteen and pin eighteen through pin twenty three for receiving said second address signal and uses pin ten as a no connect, and wherein said first DRAM component uses pin nine for receiving said row address strobe and uses pin four through pin seven and pin twenty eight as a no connect, and wherein said integrated circuit component uses pins five through seven and pin nine for each receiving a different directed row address strobe from said decoder, and wherein the remaining pins for said first DRAM component and said integrated circuit component have identical pin assignments.

12. A method for emulating a first DRAM component having a first storage capacity wherein said first DRAM component may be accessed by receiving an address signal from a controller together with DRAM control signals, said address signal including a first number of address bits, said first number of address bits including a first plurality of row address bits and a first plurality of column address bits, with an integrated circuit component including a plurality of second DRAMs, each of said plurality of second DRAMs having a second storage capacity lower than said first storage capacity, wherein the cumulative total of said second storage capacities for said plurality of second DRAMs is at least equal to the first storage capacity, and with a decoder, the method comprising:

receiving a second number of address bits from said address signal from said controller into said integrated circuit component, said second number of address bits being less than said first number of address bits;

receiving a number of decode bits from said address signal into said decoder, said number of decode bits being equal to the difference between the first number of address bits and the second number of address bits, said number of decode bits including at least one of said first plurality of row address bits and at least one of said first plurality of column address bits;

receiving at least one of said DRAM control signals into said decoder;

decoding said at least one of said first plurality of row address bits to direct the output of said received at least one DRAM control signal from said decoder to a group of second DRAMs within said plurality of second DRAMs;

outputting at least one directed DRAM control signal from said decoder for input into said integrated circuit component;

decoding said at least one of said first plurality of column address bits to deactivate all but one second DRAM within said group of second DRAMS;

accessing said one second DRAM by providing said second number of address bits thereto.

13. The method of claim 12 wherein said first plurality of row address bits and said first plurality of column address bits are multiplexed over an address bus to said first DRAM component.

14. The method of claim 12 wherein said at least one DRAM control signal includes a row address strobe, and wherein said at least one directed DRAM control signal includes a directed row address strobe.

15. The method of claim 12 wherein said at least one DRAM control signal includes a row address strobe and a column address strobe, and wherein said at least one directed DRAM control signal includes a directed row address strobe, and wherein said decoder is coupled to said at least one input for receiving said at least one directed DRAM control signal to provide the combination of the directed row address strobe and the column address strobe to said one second DRAM.

16. The method of claim 1 wherein said first DRAM component is a 16 Megabits by 4 bits DRAM and wherein said first plurality of row address bits includes 12 bits and said first plurality of column address bits includes 12 bits.

17. The method of claim 16 wherein said integrated circuit component includes four of said second DRAMs and wherein each of said second DRAMs is a 4 Megabits by 4 bits DRAM having a second plurality of row address bits and a second plurality of column address bits, said second plurality of row address bits includes 11 bits and said second plurality of column address bits includes 11 bits.

18. The method of claim 15 wherein said integrated circuit component further includes a package housing said plurality of second DRAMs, and wherein said package further include a first plurality of pins extending therefrom, at least one of said pins receiving said directed row address strobe and at least one of said pins receiving said column address strobe, and a second plurality within said first plurality of pins receiving said second row address and said second column address.

19. The method of claim 18 wherein four of said first plurality of pins may receive said directed row address strobe, and wherein each of said four pins connects to a different one of said plurality of second DRAMs for providing the directed row address strobe signal thereto, and wherein one of said first plurality of pins receives said column address strobe, and wherein said one of said first plurality of pins connects to each of said plurality of second DRAMs for providing the column address strobe thereto.

20. The method of claim 12 wherein said integrated circuit component further includes a package housing said plurality of second DRAMs, and wherein said package has a physical footprint that is identical to a physical footprint for said first DRAM component, and wherein said package further includes a plurality of pins extending therefrom, and wherein the connections of said plurality of pins to said package are identical to pin connections for a plurality of pins connected to said first DRAM component, and wherein said plurality of pins connected to said package housing said plurality of second DRAMs have pin assignments that are compatible with said plurality of pins connected to said first DRAM component to permit said integrated circuit component including said plurality of second DRAMs and said first DRAM component to be used interchangeably on a circuit board without requiring any wiring changes on the circuit board.

* * * * *